(12) United States Patent
Crozier, III et al.

(10) Patent No.: US 8,087,860 B1
(45) Date of Patent: Jan. 3, 2012

(54) SELF-INDICATING LUG NUT

(75) Inventors: Arthur Nelson Crozier, III, Mooresville, NC (US); Timothy I. Brewer, Statesville, NC (US)

(73) Assignee: T & N Products, LLC, Statesville, NC (US)

( * ) Notice: Subject to any disclaimer, the term of this patent is extended or adjusted under 35 U.S.C. 154(b) by 594 days.

(21) Appl. No.: 12/134,617

(22) Filed: Jun. 6, 2008

(51) Int. Cl.
F16B 31/02 (2006.01)

(52) U.S. Cl. ............................. 411/9; 411/5; 301/35.623

(58) Field of Classification Search .................. 411/1, 2, 411/3, 5, 9, 10, 13, 14; 301/35.623, 35.624, 301/37.374
See application file for complete search history.

(56) References Cited

U.S. PATENT DOCUMENTS

| | | | |
|---|---|---|---|
| 3,469,492 A | | 9/1969 | Dahl |
| 3,561,820 A | * | 2/1971 | Chaivre ................... 301/37.374 |
| 3,602,186 A | | 8/1971 | Popenoe |
| 3,776,031 A | | 12/1973 | Trigg |
| 3,908,508 A | | 9/1975 | Payne |
| 3,964,299 A | | 6/1976 | Johnson |
| 3,987,668 A | | 10/1976 | Popenoe |
| 3,987,699 A | | 10/1976 | Popenoe |
| 4,041,776 A | | 8/1977 | Payne |
| 4,295,761 A | * | 10/1981 | Hansen ....................... 405/259.6 |
| 4,322,195 A | | 3/1982 | Rebish et al. |
| 4,347,020 A | * | 8/1982 | White et al. ............... 405/259.5 |
| 4,600,343 A | * | 7/1986 | Frerejacques ................. 411/303 |
| 4,709,654 A | | 12/1987 | Smith |
| 4,904,132 A | | 2/1990 | Popenoe |
| 4,930,951 A | * | 6/1990 | Gilliam ........................... 411/14 |
| 5,120,174 A | | 6/1992 | Patti |
| 5,189,979 A | | 3/1993 | Popenoe |
| 5,443,332 A | * | 8/1995 | Hollis ......................... 405/259.6 |
| 5,873,689 A | * | 2/1999 | Mensour et al. .................. 411/3 |
| 5,890,857 A | | 4/1999 | Herrera |
| 6,039,408 A | * | 3/2000 | Alvarez .................... 301/35.623 |
| 6,296,429 B1 | * | 10/2001 | Wright ............................. 411/5 |
| 6,398,471 B1 | | 6/2002 | Fischer |
| 6,533,514 B2 | | 3/2003 | Fischer |
| 6,575,536 B2 | * | 6/2003 | Chen ........................ 301/35.623 |
| 7,043,992 B2 | | 5/2006 | Bernhard |
| 2006/0181139 A1 | | 8/2006 | Nilsen et al. |
| 2006/0210374 A1 | | 9/2006 | Calandra et al. |

FOREIGN PATENT DOCUMENTS

| | | |
|---|---|---|
| GB | 2323649 | 9/1998 |
| GB | 2436356 | 9/2007 |
| JP | 10-169632 | 6/1998 |
| JP | 2001-295819 | 10/2001 |
| JP | 2002-178702 | 6/2002 |
| JP | 2005-282846 | 10/2005 |
| WO | WO2005/050031 | 6/2005 |

* cited by examiner

Primary Examiner — Flemming Saether
(74) Attorney, Agent, or Firm — Womble Carlyle Sandridge & Rice, LLP

(57) ABSTRACT

A self-indicating lug nut for use with an automobile wheel stud having an outermost first external thread. The lug nut includes a nut body having an internally threaded bore including a plurality of internal threads, an outermost last internal thread, and an outer end. The lug nut further includes an indicating member removably attached to the nut body proximate to the outer end. The lug nut is configured such that when the lug nut is threadibly advanced onto the wheel stud, interfering contact between the first external thread and the indicating member displaces the indicating member from the nut body. The indicating member can separate into two or more pieces when displaced from the nut body. Displacement of the indicating member provides a visible indication that all of the internal threads of the nut body have engaged the external threads of the wheel stud.

9 Claims, 6 Drawing Sheets

SELF-INDICATING LUG NUT

FIELD OF THE INVENTION

The invention relates to lug nuts for use in securing wheels to automobiles, and more particularly relates to a lug nut that provides a readily visible indication when the lug nut has been substantially engaged with a mating threaded stud of an automobile, especially a mating threaded stud of a race car.

BACKGROUND

Wheels for automobiles are typically attached to a wheel hub by a plurality of threaded studs and a plurality of mating lug nuts. The threaded studs are equally spaced around a bolt circle on a wheel hub, and outwardly extend from the wheel hub. Large automobiles typically include five wheel studs. The tire rim of a mating wheel includes a plurality of spaced mounting holes that align with the spaced studs on the wheel hub. The wheel is mounted on the hub by placing the tire rim over the spaced studs such that a stud outwardly extends through each mounting hole, threadibly engaging a mating lug nut on each stud, and tightening each lug nut to a prescribed torque value. The portion of the wheel rim around each mounting hole is typically conically shaped, and receives a matching conical seating end of a mating lug nut. When the lug nuts are seated and tightened, the conical portions of the rims and the lug nuts cooperate to center the rim on the studs and the wheel hub.

With some modifications, wheels, rims, studs and lug nuts like those described above are used for certain types of racing cars, including racing cars like those used in stock car races sanctioned by NASCAR®. An example of a typical wheel assembly 10 of a typical American stock car is shown in FIGS. 1 and 2. As shown in FIG. 1, a tire 9 mounted on a rim 12 is mounted over five equally-spaced wheel studs 14, and is secured by five lug nuts 16 threadibly engaged on the studs (14). As shown in FIG. 2, an inner end 15 of each stud 14 is fixed to a wheel hub 20. The stud 14 includes a threaded portion 27 that outwardly extends from the hub 20, and is received through an aligned hole 11 in the tire rim 12. The rim 12 includes a conical seat 13 around each mounting hole 11. A lug nut 16 having a conical seating end 13 and an opposed outer end 23 is threadibly engaged on the threaded portion 27 of the stud 14. Each lug nut includes a threaded bore 29 and a plurality of hexagonally arranged external flats 25 for engagement with a torquing tool. Each of the lug nuts 16 is tightened to a prescribed torque value that provides a tensile preload in each stud 14 that is sufficient to retain the wheel 10 on the hub 20 under anticipated driving conditions. As shown in FIG. 2, when a lug nut 16 is engaged on a mating stud 14 and is fully seated in the conical portion 13 of the rim 12, a first or outermost male thread 19 on the stud 14 outwardly extends beyond the outer end 23 of the lug nut 23.

During a race, a car's tires 10 must be periodically changed due to tire wear or tire damage. In order to minimize the time required to change a race car's tires 10 during a race, race crews have developed a special method for installing a new tire and wheel assembly 10 onto a wheel hub 20. First, each wheel stud 14 includes a non-threaded extension 18 that outwardly extends well beyond the threaded portion 27 of each stud 14. In addition, before a race, a lug nut 16 is centered within each conical recess 13 of each wheel rim 12 of each replacement tire 10, and the lug nuts 16 are glued to the rim with a temporary adhesive. During an in-race tire change, once an old tire has been removed, a new tire 10 with the adhered lug nuts 16 is placed over the extensions 18 on each stud 14. As shown in FIG. 2, the extensions can include a tapered or bullet-shaped tip 17 for use in guiding the rim 12 over the studs 14. When a first lug nut 16 is seated and tightened using a powered torque wrench, the rim 12 is drawn tight up against the wheel hub 20. As the rim 12 is drawn against the hub 20, contact between the other untightened lug nuts 16 and the first threads 19 on their respective mating studs 14 causes the other glued-on lug nuts 16 to separate from the rim. Once separated, the untightened lug nuts 16 are suspended in place by the wheel stud extensions 18 until they are individually seated and torqued. Accordingly, by gluing the lug nuts 14 to the rims 12 and by providing wheel stud extensions 18 to capture the lug nuts 14 once separated, the need to individually position each lug nut 16 over a mating stud 14 is eliminated, and valuable time can be saved.

On occasion, it is possible that a lug nut 16 is not fully engaged or fully tightened onto its mating stud 14 during a pit stop. During a race, even a single loose lug nut 16 can present several problems. First, a partially secured tire 10 can cause unwanted vibration that can affect a race car's handling and performance. Second, and most importantly, even a single loose lug nut 16 can cause a partially secured tire 10 to break free from its hub 20, thereby creating a substantial danger to the car's driver, other drivers, race crews, race officials, and other bystanders, including race spectators. Because stock cars can reach speeds of up to about 200 miles per hour, a loose tire can become a dangerous projectile. Accordingly, racing rules prohibit cars from racing with one or more loose lug nuts, and race officials are assigned to observe tire changes and to inspect cars for loose lug nuts before the cars return to the racetrack. If a race official observes a loose lug nut on a car as the car leaves the pit, the official will order the car to immediately return to the pit to correct the problem. One method for visually confirming that a lug nut 16 is fully engaged on the threaded portion 27 of a stud 14 is to confirm that at least the first thread 19 of the stud 14 is visible beyond the outer end 23 of the nut 16. Though such a method cannot absolutely confirm that a lug nut 16 is fully tightened onto a mating wheel stud 14, the method does provide verification that all of the internal threads 29 of the lug nut 16 are engaged with the external threads 27 of the stud 14, and that the lug nut 16 is very likely to be fully seated against a tire's rim 12.

Unfortunately, it can be very difficult to visually detect a loose lug nut 16 during a race. In particular, it can be very difficult to detect a loose lug nut 16 after a tire change, and before a car leaves the pit and returns to the racetrack. Because all four tires can be changed by an expert pit crew in less than fifteen seconds, there is very little time for a crew member or race official to visually inspect all twenty of car's lug nuts 6 before the car returns to the racetrack. In addition, an inspecting race official or crew member may be a substantial distance away or at a less than ideal position, thus making it difficult to visually detect that one or more lug nuts is loose on one or more tires. Accordingly, there is a need for an improved lug nut that can provide a reliable and readily visible indication that a lug nut has been fully engaged onto the threads of a mating wheel stud, and that a race car can safely return to racing.

SUMMARY

One embodiment of the invention includes a self-indicating lug nut for use with an automobile wheel stud having an outermost first external thread. In this embodiment, the lug nut can include a nut body having an internally threaded bore including a plurality of internal threads, an outermost last internal thread, and an outer end. The lug nut can further include an indicating member removably attached to the nut body proximate to the outer end. The lug nut can be configured such that when the lug nut is threadibly advanced onto the wheel stud, interfering contact between the first external thread and the indicating member will cause the indicating member to be displaced from the nut body. The displaced indicating member can provide a visible indication that all of the internal threads of the nut body have engaged the external threads of the wheel stud.

Another embodiment of the invention includes a method for visually verifying that a lug nut has been threadibly engaged with a mating automobile wheel stud. In this embodiment, the method can include providing a lug nut with an outer end and an indicator member removably attached to the lug nut proximate to the outer end; placing the lug nut onto the wheel stud; and visually determining whether the indicator member has been displaced from the lug nut. Displacement of the indicator member from the lug nut can provide a positive indication that all of the internal threads of the lug nut have been engaged with the external threads of the wheel stud. In contrast, non-displacement of the indicator member from the lug nut can provide a negative indication that all of the internal threads of the lug nut have not been engaged with the external threads of the wheel stud.

A further embodiment of the invention includes a self-indicating lug nut for use in securing a wheel rim to a wheel hub of an automobile. The wheel rim can include a plurality of stud-receiving holes with nut seating surfaces therearound, and the wheel hub can include a plurality of wheel studs of the type including unthreaded extensions on their outer ends, and a plurality of external threads, including outermost first external threads. In this embodiment, the lug nut can include a nut body including an internally threaded bore including a plurality of internal threads, a seating end, and an outer end. An indicating member can be removably attached to the nut body proximate to the outer end, and can include an opening sized to permit passage of an unthreaded extension of a mating wheel stud therethrough. The lug nut can be configured such that the indicating member is separated from the nut body in at least two pieces when the internal threads are threadibly engaged with the external threads of the mating wheel stud.

BRIEF DESCRIPTION OF THE DRAWINGS

FIG. 4 is an exploded perspective view of the self-indicating lug nut assembly shown in

FIG. 3.

DETAILED DESCRIPTION

Figure 1:
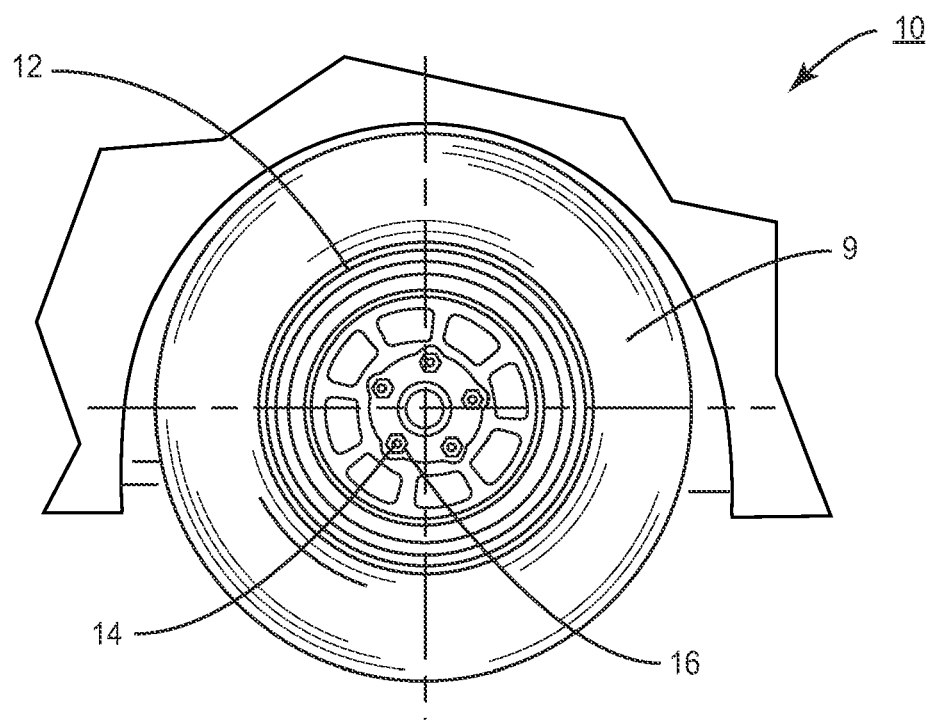
FIG. 1 is an elevation view of a typical prior art wheel installation on a racing stock car.
Figure 2:
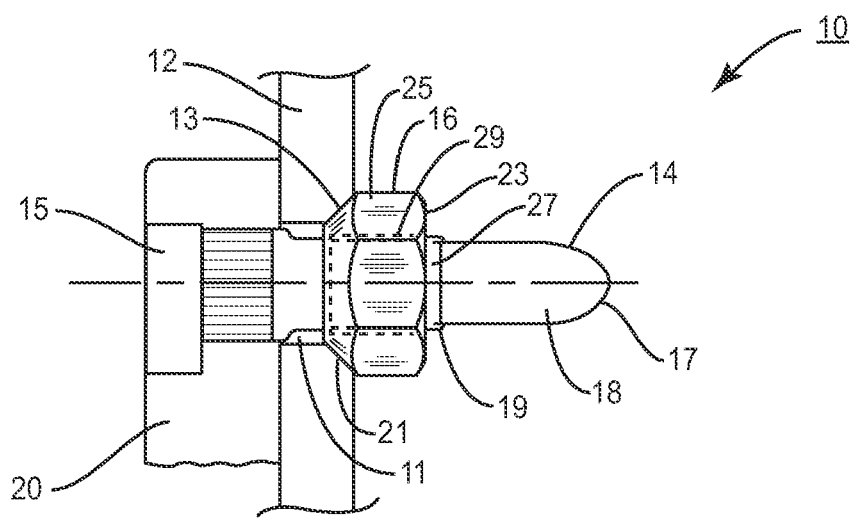
FIG. 2 is a cross-sectional view of a typical wheel stud and lug nut assembly on a typical prior art wheel installation like that shown in FIG. 1.
Figure 3:
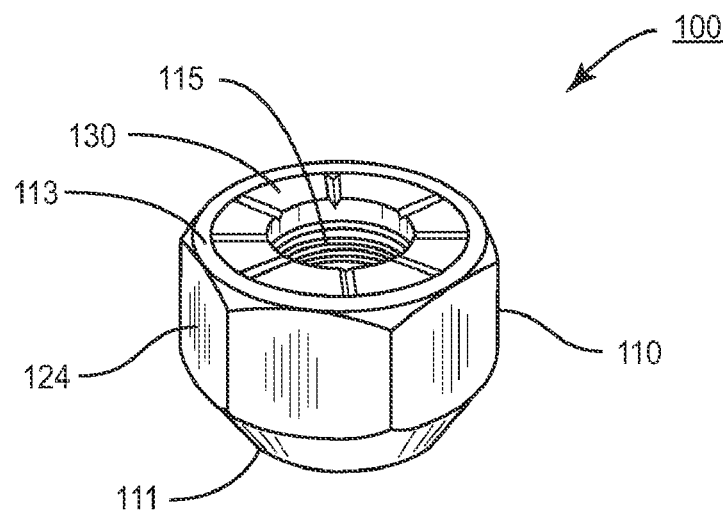
FIG. 3 is a perspective view of one embodiment of a self-indicating lug nut assembly according to the invention.
Figure 4:
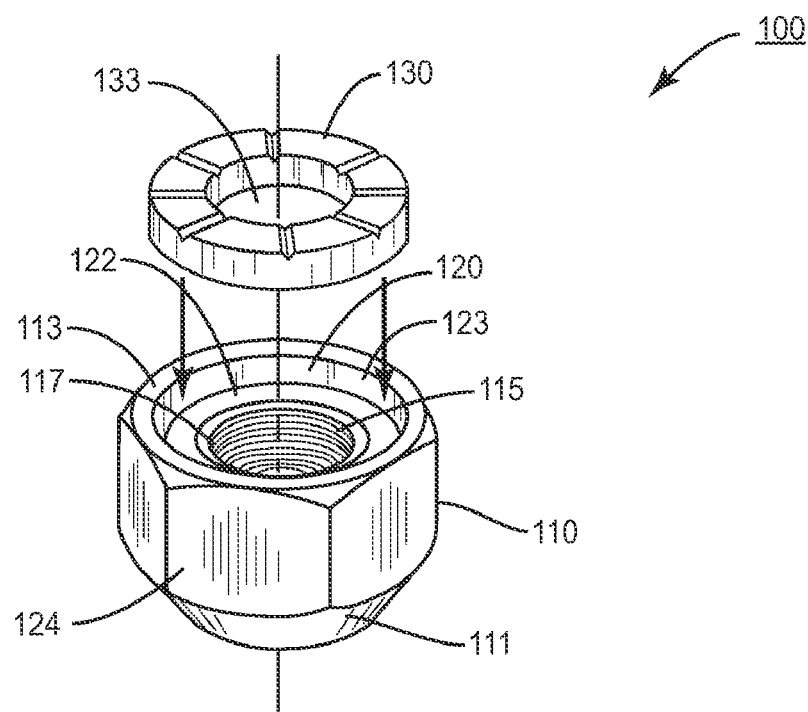

One embodiment of a self-indicating lug nut 100 according to the invention is shown in FIGS. 3-7. As shown in FIG. 3, in this embodiment, the lug nut 100 includes a body 110 having a seating end 111 and an outer end 113. In the embodiment shown, the seating end 111 has a conical shape, and is configured to mate with a conical seat of a conventional wheel rim of the type commonly used in American stock car racing. The body 110 also includes an internally threaded bore 115, and a hex-shaped outer profile 124. As shown in FIG. 4, the internally threaded bore 115 includes an outermost or last internal thread 117. In one embodiment, the internally threaded bore 115 includes female threads that are compatible with a conventional wheel stud of the type commonly used in American stock car racing, and the hex-shaped outer profile 124 is configured for use with conventional wheel lug nut torquing equipment of a type commonly used in American stock car racing. For example, the internal threads 115 can be ⅝-18 UNF, and the outer profile 124 of the nut body 110 can have a hexagonal shape with a nominal flat-to-flat dimension of about one inch. As shown in FIG. 4, the body 110 also can include a counterbore or recess 120 in its outer end 113. The recess 120 can be bounded by an outer wall 123 and a bottom 122. The outer wall 123 can have a cylindrical shape, and the bottom can be substantially flat, as shown in FIG. 4. Preferably, the length of the internal threads 115 is the same as the thread length of a conventional lug nut that is to be replaced by a self-indicating lug nut 100 according to the invention.

In the embodiment shown in FIGS. 3 and 4, the lug nut 100 includes an indicating member 130. In this embodiment, the indicating member 130 is disc-shaped, includes an open center 133, and is sized to be removably received in the recess 120 in the outer end 113 of the nut body 110. As can be seen by comparing FIGS. 3 and 4, when the indicating member 130 is received in the recess 120, the bottom 122 and outer wall 123 are substantially hidden from view by the indicating member 130.

Figure 5:
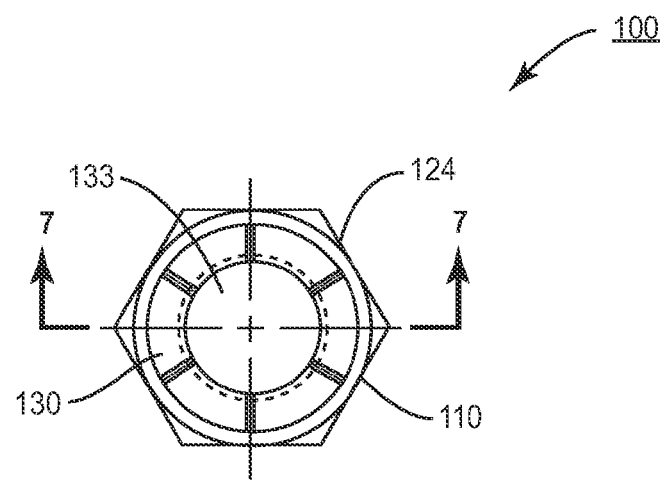
FIG. 5 is a top plan view of the self-indicating lug nut assembly shown in FIGS. 3 and 4.
Figure 6:
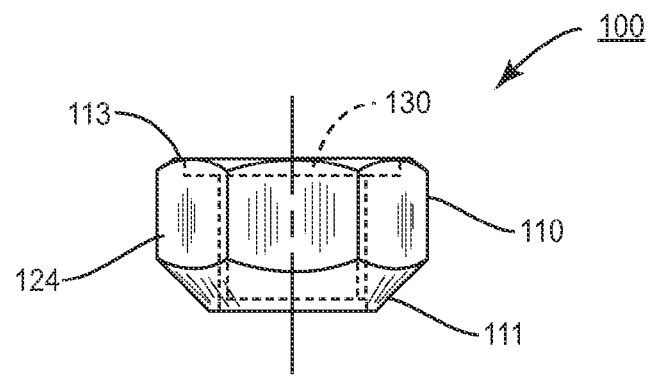
FIG. 6 is a side elevation view of the self-indicating lug nut assembly shown in FIGS. 3-5.
Figure 7:
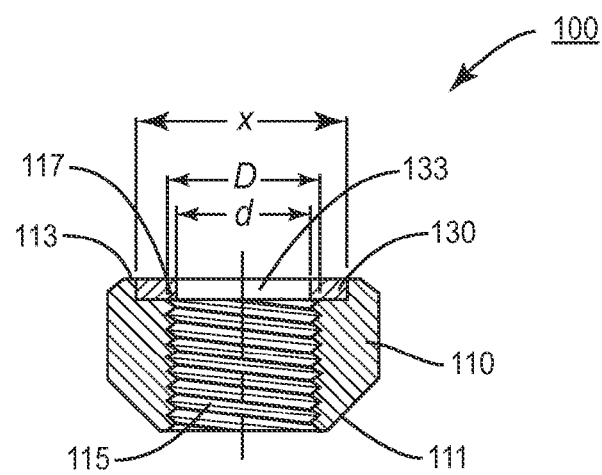
FIG. 7 is cross-sectional view of the self-indicating lug nut assembly shown in FIGS. 3-6 taken along line 7-7 in FIG. 5.

Additional details of one embodiment of a self-indicating lug nut 100 like that described above are shown in FIGS. 5-7. As shown in FIG. 5, the indicating member 130 and its open center 133 are concentric with the nut body 110. As shown in FIG. 6, the indicating member 130 can be substantially flush with the outer end 113 of the nut body 110. In FIG. 7, the relative diameters of the indicating member 130 and the threads 115 of the nut body 110 are shown. In one embodiment, the diameter "d" of the indicating member 130 is at least slightly smaller than a major diameter "D" of the internal threads 115. As shown in FIG. 7, the indicating member 130 has an outer diameter that is substantially equal to the diameter "x" of the recess 120 in the nut body 110. In one embodiment, the outer diameter of the indicating member 130 is slightly larger than the diameter "x" of the recess 120. Accordingly, a slightly larger indicating member 130 can be pressed into the recess 120, and the indicating member 130 will be securely and removably retained within the recess 120.

Figure 8:
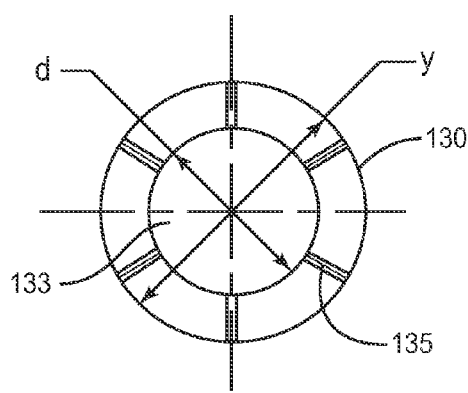
FIG. 8 is top plan view of one embodiment of an indicating member for use in the self-indicating lug nut assembly shown in FIGS. 3-7.
Figure 9:
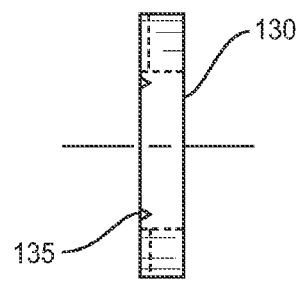
FIG. 9 is a side elevation view of the indicating member shown in FIG. 8.

One embodiment of an indicating member 130 is shown in FIGS. 8 and 9. In this embodiment, the indicating member 130 is disc-shaped and includes a central circular opening 133 having a diameter "d". In this embodiment, the diameter "d" can be slightly larger than the outer diameter of the unthreaded extension portion of a conventional wheel stud 14 of a type commonly used in American stock car racing. As also shown in FIGS. 8 and 9, the indicating member 130 can include a plurality of surface discontinuities, such as a plurality of spaced grooves or notches 135 in its outermost surface. As discussed further below, the spaced notches 135 facilitate fracturing of the indicating member 130 when the self-indicating nut 100 is installed onto a wheel stud 14. In the embodiment shown in the figures, the indicating member 130 includes six equally-spaced and radially-aligned notches 135, though the indicating member 130 can include more or fewer notches 135. As also shown the figures, the notches 135 can be substantially V-shaped, though square, U-shaped, and other notch forms also can be used. The indicating member 130 can be constructed of a substantially brittle or otherwise frangible material such as styrene or another polymeric material. Substantially any other material that permits the indicating member 130 to function as described below can also be used.

Figure 10A:
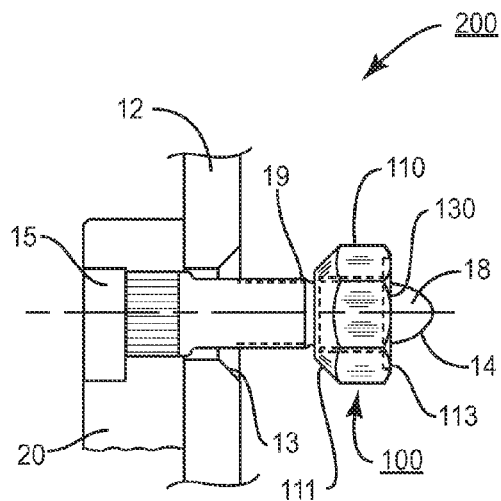
FIGS. 10A-10D are cross-sectional views showing a sequence of steps for installing a self-indicating lug nut assembly like that shown in FIGS. 3-7 onto a conventional racecar wheel stud.

The installation of a self-indicating lug nut 100 like that described above in a wheel assembly 200 is shown in FIGS. 10A-10D. In FIG. 10A, a self-indicating lug nut 100 is suspended on an unthreaded extension 18 of a conventional racing wheel stud 14. As is apparent, the axial dimension of the threads on the stud 14, between the wheel rim 12 and the end of the threaded portion is the same as the axial dimension of the internal threads 15 of the lug nut 100. At this stage of assembly, the internal threads 115 of the lug nut are not yet threadibly engaged with the external threads 27 on the stud 14. For example, the position of the lug nut 100 shown in FIG. 10A can result when a wheel rim 12 to which the lug nut 100 has been temporarily glued has been seated against the wheel hub 20 by torquing a second adjacent lug nut onto an adjacent wheel stud. As the rim 12 is seated against the wheel hub 20, a first external thread 19 on the stud 14 pushes on the lug nut 100, causing the nut 100 to be separated from the rim 12, and to be suspended on the stud extension 18. As shown in 10B, the lug nut 100 is threaded onto the stud by any type of torquing device. In FIG. 10B, the nut 100 is shown at a point where the first thread 19 of the stud 14 just contacts the inner surface of the indicating member 130. At this point, the seating end 111 of the nut 100 is not yet seated against the seating surface 13 of the rim 12.

Figure 10C:
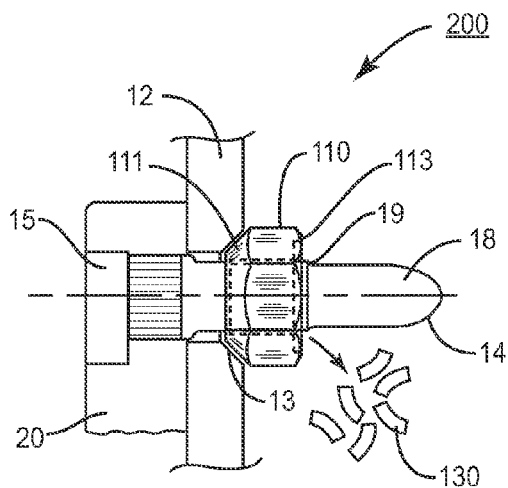
Figure 10B:
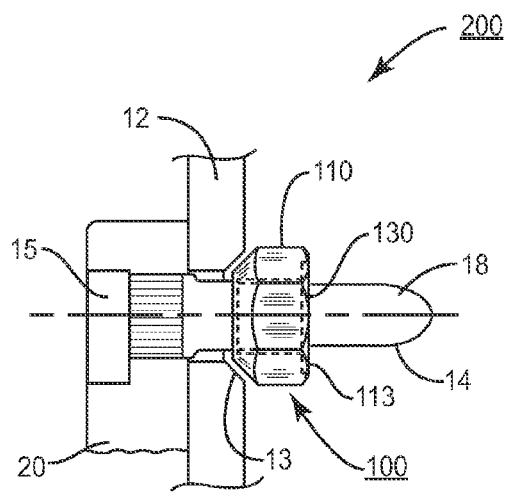
Figure 10D:
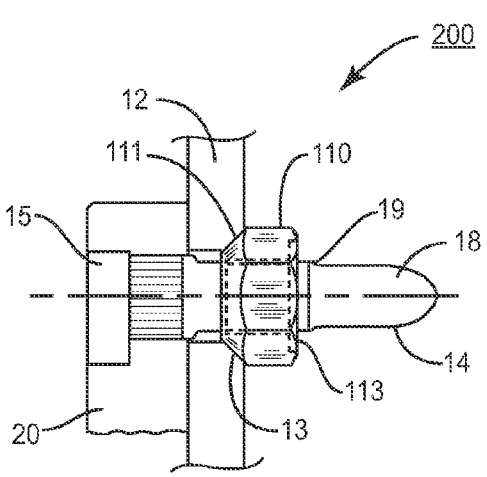
Figure 11:
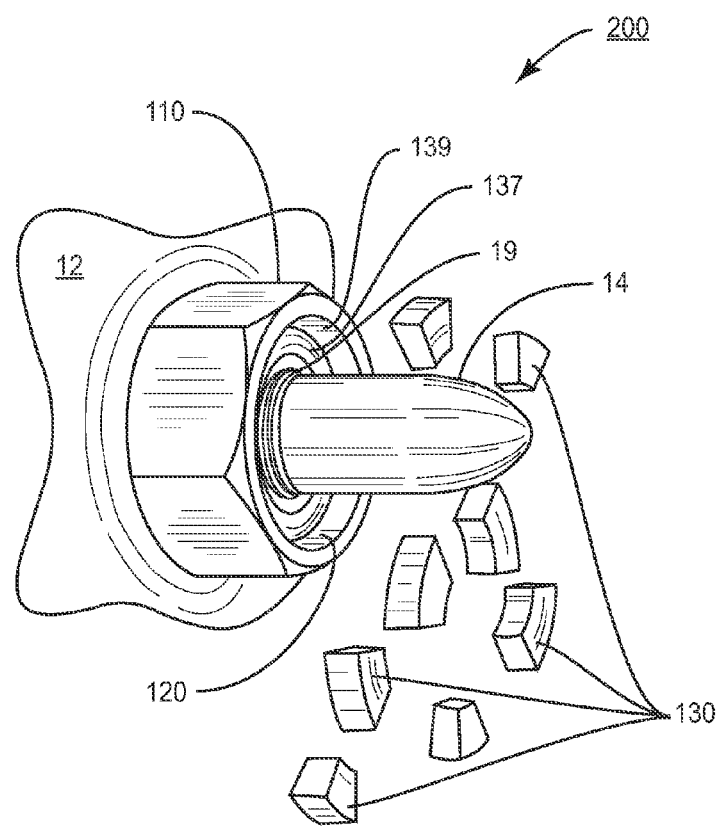
FIG. 11 is a perspective view showing a self-indicating lug nut assembly like that shown in FIGS. 3-7 and 10A-10D fully engaged with the threads of a conventional racecar wheel stud.

FIG. 10C shows the self-indicating lug nut 100 further advanced on the stud 14 to a point where all of the internal threads 115 of the nut 100 are engaged with the external threads 27 of the stud 14. Because the inner diameter of the opening 133 in the indicating member 130 is smaller than the major thread diameter of the first thread 19 on the stud 14, interfering contact between the first external thread 19 and the indicating member 130 causes the indicating member 130 to be displaced from the outer end 113 of the nut 100 as the first external thread 19 passes the last internal thread 117 and exits the outer end 113 of the nut 100. In one embodiment like that shown in FIG. 10C, the interfering contact between the first external thread 19 and the indicating member 130 as the nut 100 is screwed onto the thread is sufficient to cause the indicating member 130 to fracture into two or more pieces 130'. As described above, the indicating member 130 can include one or more surface discontinuities, such as notches 135, that facilitate the fracturing of the indicating member 130 as the outer end 113 of the nut 100 is advanced past the first external thread 19 of the stud 14. As shown in FIG. 10D, at the point that the indicating member 130 is fully displaced from the lug nut 100, the first external thread 19 is at or beyond the outer end 113 of the nut body 110, all of the internal threads 115 of the nut 100 are engaged with the external threads 27 of the stud 14, and the nut 100 is fully seated or nearly fully seated against the wheel rim 12. Accordingly, the absence of the indicating member 130 from the outer end 113 of the nut 100 provides a readily visible indication that the nut 100 is fully engaged with the threads 27 of the stud 14. In addition, because the process used to install the nuts 100 onto the studs 14 makes it extremely likely that a nut 100 has either been fully torqued and seated, or has not been torqued at all, the absence of the indicating member 130 from the outer end 113 of the nut 100 also provides a reliable visible indication that the nut 100 has been tightened and is seated against a mating tire rim 12. Conversely, the presence of the indicating member 130 on the outer end 113 of the nut 100 provides a readily visible indication that all of the internal threads 115 of the nut 100 are not fully engaged with the external threads 27 of the stud 14, and that the nut 100 has not been seated against a mating rim 12.

In order to enhance the visibility of the presence or absence of the indicating member 130 on the outer end 113 of the lug nut 100, the indicating member 130 can be colored a bright or highly visible first color. For example the indicating member 130 can be constructed of a brightly colored material, or can be painted a bright color. In one embodiment, the indicating member 130 can be colored red, such that the presence of the red indicating member 130 indicates to crew members or race officials to "STOP". In addition, one or more indicator surfaces 122, 123 on the nut body 110 that are exposed by a displaced indicating member 130 can be colored or painted with a contrasting second color. For example, the bottom 122 and/or outer wall 123 of the recess 120 shown in FIG. 4 can be colored green, such that the absence of the displaced indicating member from the recess 120 indicates to crew members or race officials to "GO". Of course, other highly visible and/or contrasting colors other than red and green can also be used for the indicating member 130 and indicator surface(s) 122, 123, including various fluorescent colors, white and black, and the like.

The embodiments of the invention described above are intended to illustrate various aspects and features of the invention without limiting the invention thereto. Persons of ordinary skill in the art will recognize that certain modifications and changes can be made to the described embodiments without departing from the scope of the invention. For example, though the indicating member 130 has been primarily described as being constructed in one piece that will fracture when displaced by contact with a first thread 19 of a mating wheel stud 14, the indicating member 130 can be constructed in a single piece that does not fracture, or can be constructed in two or more pieces that separate and fall away when displaced from the nut body 110 without fracturing. In addition, though the indicating member 130 has been described as being received within a recess 120 in the outer end 113 of the nut body 110 the indicating member 130 and nut 100 can be configured such that the indicating member is attached to or on the outer end 113 of the nut 100 in other ways. For example, the indicating member can be attached to the nut body with an adhesive material, or the indicating member can be cap-shaped and removably received over a mating end of the nut 100. In another embodiment, the indicating member can include a stationary portion that is pinned or otherwise affixed to an outer end of the nut body, and a separate removable portion that is removably attached to the stationary portion. All such changes and modifications are intended to be within the scope of the appended claims.

What is claimed is:

1. A method for visually verifying that a lug nut has been threadibly engaged with a mating automobile wheel stud of the type having a plurality of external threads including an outermost first external thread and an unthreaded extension, the method comprising:
   (a) providing a lug nut including internal threads, a seating end, an outer end, and an indicator member removably attached to the lug nut proximate to the outer end, the indicating member including an opening sized to permit passage of the unthreaded extension, but not the external threads;
   (b) placing the lug nut onto the wheel stud; and
   (c) the axial dimension of the threads on the stud between the wheel rim and the end of the threads being the same as the axial dimension of the internal threads on the nut body;
   (d) wherein displacement of the indicator member from the lug nut provides a positive visual indication that all of the internal threads of the lug nut have been engaged with the external threads of the wheel stud, and wherein non-displacement of the indicator member from the lug nut provides a negative indication that all of the internal threads of the lug nut have not been engaged with the external threads of the wheel stud.

2. A method according to claim 1 wherein displacement of the indicator member includes separation of the indicator member into two or more pieces.

3. A method according to claim 2 wherein the indicator member comprises a substantially brittle material, and wherein separation of the indicator member into two or more pieces includes at least partial fracturing of the indicator member.

4. A method according to claim 1 wherein the indicator member includes a first color, wherein portions of the lug nut are uncovered when the indicator member is displaced from the lug nut, and wherein at least one portion of the lug nut that is uncovered includes a second color different from the first color.

5. A stud and self-indicating lug nut assembly for use in securing a wheel rim to a wheel hub of an automobile and providing a visual indication thereof, the wheel rim including a plurality of stud-receiving holes with nut seating surfaces therearound, and the wheel hub including a plurality of wheel studs extending therefrom, each assembly comprising:
   (a) a wheel stud having a plurality of external threads, including an outmost first external thread, and an unthreaded extension;
   (b) a nut body including an internally threaded bore including a plurality of internal threads, a seating end, and an outer end;
   (c) an indicating member removably attached to the nut body proximate to the outer end, the indicating member including an opening sized to permit passage of an unthreaded extension of the mating wheel stud therethrough;
   (d) the axial dimension of the threads on the stud between the wheel rim and the end of the threads being the same as the axial dimension as the internal threads on the nut body;
   (e) wherein the lug nut is further configured such that, when the lug nut is completely placed upon the wheel stud, the indicating member separates from the nut body in at least two pieces, providing a visual indication that the last internal thread of the nut body has fully engaged the outermost first external thread of the mating wheel stud and that the nut is fully tightened against the stud-receiving hole through which the stud extends.

6. A stud and self-indicating lug nut assembly according to claim 5 wherein the nut body includes a recess in its outer end, and wherein the indicating member is removably received within the recess.

7. A stud and self-indicating lug nut assembly according to claim 5 wherein the indicating member comprises a substantially brittle material.

8. A stud and self-indicating lug nut assembly according to claim 5 wherein the nut body includes at least one indicator surface that is uncovered when the indicating member separates from the nut body.

9. A stud and self-indicating lug nut assembly according to claim 8 wherein the indicating member includes a first color, and the indicator surface includes a second color different from the first color.

* * * * *